Patented June 28, 1949

2,474,686

UNITED STATES PATENT OFFICE 2,474,686

ALLYL DIGLYCOLYL ALLYL GLYCOLATE

Harry T. Neher, Bristol, Edwin H. Kroeker, Cheltenham, and Willard J. Croxall, Bryn Athyn, Pa., assignors to Rohm & Haas Company, Philadelphia, Pa., a corporation of Delaware No Drawing. Application September 4, 1947, Serial No. 772,216

1 Claim. (Cl. 260—78.3)

This invention relates to allyl diglycolyl allyl glycolate and to the polymers thereof. It further relates to copolymers formed from allyl diglycolyl allyl glycolate and a polymerizable ethenoid which is miscible therewith.

Allyl diglycolyl allyl glycolate may be prepared in a number of ways. Probably, the most convenient of these comprises forming the monallyl ester of diglycolic acid, converting this to the half salt, and reacting this salt with allyl chloroacetate. The reaction product may be purified by distillation at low pressures.

Allyl diglycolyl allyl glycolate is a liquid which can be purified to a colorless state and which can be polymerized under the influence of heat and/or peroxide catalysts to a hard, tough state. The properties of the polymer are particularly favorable and the ease of preparation of the polymer in a solid, coherent state free from serious flaws commends this compound over previously known types of allyl esters. Compared to diallyl diglycolate on the one hand, the ester of this invention is superior in its casting and molding properties in yielding polymeric materials which are more coherent and free from flaws. On the other hand, the ester of this invention has definite advantages over bis(allyl glycolyl) diglycolate in ease of preparation and purification, and in the quality of polymer obtainable from the monomeric esters. The polymers of allyl diglycolyl allyl glycolate are exceptional in constituting the first known case of a cross-linked polymer possessing flexural and impact strengths equal to or exceeding those of linear polymethyl methacrylate polymers.

Details of preparation of the ester of this invention are given in the following example.

Example 1

There were mixed 1524 parts of diglycolic anhydride and 780 parts of allyl alcohol. The mixture was warmed to dissolve the anhydride and heated for one hour at 90°–97° C. to form the monoallyl ester. To the half ester, 2000 cc. of xylol and 705 parts of sodium carbonate were added. The carbonate was added slowly in small portions, so that excessive foaming did not occur. The water of neutralization was removed by azeotropic distillation under reduced pressure using an automatic water separator. When all of the water had been removed, 1800 parts of allyl chloroacetate and 18 parts of beta-naphthol were added. The mixture was heated 24 hours at 130°–140° C., cooled, washed with a concentrated sodium carbonate solution, separated, and dried over anhydrous potassium carbonate. Fractionating gave 1010 parts of the desired ester which had a boiling point of 165° C./½ mm. and a purity, as determined by the bromine number, of 99.7%.

A portion of the ester thus prepared was taken, treated with 2% of benzoyl peroxide, and placed in a cell formed with glass plates held in spaced relation to form a sheet. The cell was placed in an oven at 80° C. and heated overnight. It was then placed in an oven at 120° C. for two hours. The plates were removed from the cast sheet, which was allowed to cool. There was thus obtained a clear, transparent sheet which was exceptionally hard. Tested for abrasion resistance under falling sand from a funnel, it remained clearer than plate glass tested under the same conditions.

Another portion of 100 parts was treated with 1.5 parts of benzoyl peroxide and 0.5 part of tert.-butyl perbenzoate. The liquid was poured into a glass cell with flexible spacers and heated for 18 hours at 80° C. The cell and contents were then heated to 125° C. for two hours and the cell parts removed while hot. The sheet was quite strong even while hot, differing in this respect from all other allyl polymers which have been examined.

Physical tests were made in comparison with a standard methyl polymethacrylate sheet. Flexural strength for the new polymer was 14,800 p.s.i. compared to 13,000 p.s.i. for the acrylic resin; impact strength (Charpy unnotched) was 18.3" versus 17.0"; abrasion resistance was 1 compared to 10 by a modified Taber test.

The flexural strength was determined by dropping a ¼ lb. steel ball onto a 3" x ½" x 3/16" test piece supported on rounded steel bars two inches apart and is expressed as the height in inches at which the ball just broke the test piece. The abrasion resistance was determined by a modified Taber wiping test and the abraded pieces are evaluated by comparison with a series of standard abrasions in which plate glass is 1 and Plexiglass is 10.

While allyl diglycolyl allyl glycolate may be copolymerized with a great variety of other olefinic compounds which are capable of yielding polymers, the copolymers formed with the esters of acrylic and/or methacrylic acid with saturated lower aliphatic alcohols are of particular promise. There may be used the methyl, ethyl, propyl, and butyl esters of acrylic and/or methacrylic acids or mixtures of such esters. The alcohol residues may be straight or branched. Copolymers containing 50 to 10 parts of such acrylic esters and 50 to 90 parts of allyl diglycolyl allyl glycolate have an exceptionally favorable balance of properties.

The greatest hardness among copolymers is attained when the shortest alcohol group is used. Longer alcohol residues impart greater flexibility with a lessened tendency for bubble-formation when the copolymer is heated to effect polymerization. The optimum balance of properties is reached with greatest ease of preparation when the proportions of allyl diglycolyl allyl glycolate are about 60 to 75 parts to 40 to 25 parts of an acrylic ester.

The formation of a typical copolymer is described in the following examples.

Example 2

A mixture was made with 75 parts of allyl diglycolyl allyl glycolate and 25 parts of methyl methacrylate. Thereto were added two parts of acrylic acid (to aid in preventing the formation of "let-goes" during polymerization), one part of benzoyl peroxide, and one-half part of tert.-butyl perbenzoate. The mixture was then poured into a cell formed from glass plates and spacers. The filled cell was maintained at 80° C. for 16 hours and then heated at 120° C. for two hours. While the cell was still hot, it was opened and the cast sheet removed and cooled.

It was a clear, transparent, tough, hard sheet which had excellent abrasion resistance.

Physical measurements were made by the methods previously described in Example 1. The flexural strength was found to be 15,400 p.s.i. compared to 13,000 p.s.i. for commercial acrylic sheets and 9,000 p.s.i. for the availabe commercial allyl resins. The impact strength was equal to that of methyl methacrylate cast sheets. The abrasion resistance by the Taber wiping test was 3 on the scale above-defined.

Example 3

A mixture was made from 60 parts of allyl diglycolyl allyl glycolate and 40 parts of methyl methacrylate and thereto were added 1.5 parts of benzoyl peroxide and 0.5 part of tert.-butyl perbenzoate. The mixture was heated in a mold for 16 hours at 77° C. and then heated for two hours at 110° C. The resulting cast sheet was removed from the mold after it had cooled to 60° C.

It was examined by the methods described in Example 1 and found to have the following properties:

Flexural strength_____ 15,500 p. s. i.
Impact strength_____ 12"
Abrasion resistance_____ 3

Example 4

A mixture was prepared from 80 parts of allyl diglycolyl allyl glycolate and 20 parts of ethyl methacrylate with one part of benzoyl peroxide and 0.5 part of tert.-butyl perbenzoate. The mixture was placed in a glass-sided cell and heated for 16 hours at 80° C. and then for one hour at 115° C. The sheet resulting had the following physical properties:

Flexural strength_____ 14,900 p. s. i.
Impact strength_____ 17"
Abrasion resistance_____ 4

Example 5

A mixture was prepared from 75 parts of allyl diglycolyl allyl glycolate and 25 parts of ethyl acrylate with 1.5 parts of benzoyl peroxide and 0.5 part of tert.-butyl perbenzoate. This mixture was heated in a cell at 70° C. for 16 hours and at 110° C. for two hours. The resulting clear, colorless sheet had the following properties:

Flexural strength_____ 14,600 p. s. i.
Impact strength_____ 13"
Abrasion resistance_____ 4

The amount of organic peroxide which may be used in converting the monomeric materials to hard polymers varies from about 0.5% to about 4% of the monomers used, depending in part upon the choice of organic peroxide and the temperatures of polymerization. The optimum concentrations of benzoyl peroxide, by way of specific example, are 1% to 3% with polymerization times of 10 to 20 hours. While gels may form in two to four hours, continued heating is desirable to complete the polymerization and bring out full strength and hardness. As polymerization progresses, higher temperatures may be applied, temperatures of 110° C. to 150° C. being practical. At these temperatures the molds are readily removed although the polymeric products are not strong at these temperatures. They become strong and hard when cooled.

We claim:

A copolymer from 60 to 75 parts of allyl diglycolyl allyl glycolate and 40 to 25 parts of methyl methacrylate.

HARRY T. NEHER.
EDWIN H. KROEKER.
WILLARD J. CROXALL.

REFERENCES CITED

The following references are of record in the file of this patent:

UNITED STATES PATENTS

| Number | Name | Date |
|---|---|---|
| 2,379,251 | Muskat et al. | June 26, 1945 |
| 2,387,931 | Muskat et al. | Oct. 30, 1945 |